US012742075B2

(12) United States Patent
Hamajima

(10) Patent No.: US 12,742,075 B2
(45) Date of Patent: Sep. 22, 2026

(54) WATER REPELLENT COMPOSITION AND FIBER TREATMENT AGENT

(71) Applicant: SHIN-ETSU CHEMICAL CO., LTD., Tokyo (JP)

(72) Inventor: Yuta Hamajima, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 828 days.

(21) Appl. No.: 18/029,015

(22) PCT Filed: Oct. 8, 2021

(86) PCT No.: PCT/JP2021/037262
§ 371 (c)(1),
(2) Date: Aug. 25, 2023

(87) PCT Pub. No.: WO2022/080243
PCT Pub. Date: Apr. 21, 2022

(65) Prior Publication Data

US 2024/0279484 A1 Aug. 22, 2024

(30) Foreign Application Priority Data

Oct. 15, 2020 (JP) ................................ 2020-173861

(51) Int. Cl.
*C09D 5/16* (2006.01)
*C09D 183/04* (2006.01)
*D06M 13/503* (2006.01)
*D06M 13/513* (2006.01)
*D06M 15/643* (2006.01)
*D06M 23/10* (2006.01)
*D06M 101/06* (2006.01)
*D06M 101/32* (2006.01)

(52) U.S. Cl.
CPC ............ *C09D 5/16* (2013.01); *C09D 183/04* (2013.01); *D06M 13/503* (2013.01); *D06M 13/513* (2013.01); *D06M 15/643* (2013.01); *D06M 23/10* (2013.01); *D06M 2101/06* (2013.01); *D06M 2101/32* (2013.01); *D06M 2200/12* (2013.01)

(58) Field of Classification Search
None
See application file for complete search history.

(56) References Cited

U.S. PATENT DOCUMENTS

| | | | |
|---|---|---|---|
| 3,065,194 A * | 11/1962 | Nitzsche | C08L 83/04 528/14 |
| 2010/0112883 A1 | 5/2010 | Giraud et al. | |
| 2022/0340756 A1 | 10/2022 | Nishijima et al. | |

FOREIGN PATENT DOCUMENTS

| | | |
|---|---|---|
| EP | 1 595 022 B1 | 9/2011 |
| FR | 2 851 265 B1 | 4/2005 |
| JP | 7-305053 A | 11/1995 |
| JP | 3496976 B2 | 2/2004 |
| JP | 2007-217575 A | 8/2007 |
| JP | 3973184 B2 | 9/2007 |
| JP | 4726647 B2 | 7/2011 |
| JP | 2012-57000 A | 3/2012 |
| WO | WO 2020/090797 A1 | 5/2020 |

OTHER PUBLICATIONS

Extended European Search Report for European Application No. 21879982.3, dated Nov. 21, 2024.
International Search Report for PCT/JP2021/037262 mailed on Nov. 22, 2021.
Written Opinion of the International Searching Authority for PCT/JP2021/037262 mailed on Nov. 22, 2021.

* cited by examiner

*Primary Examiner* — Fred M Teskin
(74) *Attorney, Agent, or Firm* — Birch, Stewart, Kolasch & Birch, LLP

(57) ABSTRACT

A water repellent composition that contains
(A) a trialkylsiloxysilicate represented by average composition formula (1): 100 mass parts,
(B) an organopolysiloxane having at least two hydroxyl groups or alkoxy groups in the molecule represented by formula (2): 1-100 mass parts,
(C) one or more selected from tetraalkoxytitaniums represented by general formula (3)

$$M(OX)_4 \quad (3)$$

(in the formula, M is titanium or zirconium, X are each independently a C1-8 alkyl group): 10-300 mass parts, and
(D) an organic solvent: 100-30,000 mass parts,
has an excellent water repellency-imparting effect, and can impart good softness to treated fibers.

4 Claims, No Drawings

WATER REPELLENT COMPOSITION AND FIBER TREATMENT AGENT

TECHNICAL FIELD

The present invention relates to a water repellent composition and a textile treatment agent. More specifically, the invention relates to a water repellent composition which is composed of a silicone compound and is able to impart a high water repellency to textile fibers. The invention relates also to a textile treatment agent containing this composition.

BACKGROUND ART

Silicone-based water repellents have hitherto been used as a way to impart water repellency to natural fibers, synthetic fibers, leather, paper and the like. In particular, of silicone-based water repellents, it has been disclosed that those which contain a trialkyl silicate and an alkoxytitanium have a good water-repelling performance (Patent Document 1).

Silicone-based water repellents which include a hydrolyzable group-containing polyorganosiloxane and a metal alkoxide such as a tetraalkoxytitanium or a tetraalkoxyzirconium have been described (Patent Document 2). In addition, to prevent discoloration of the treated objects, water repellents which utilize a trialkyl silicate and a zirconium compound have been described (Patent Document 3). When a water repellent composition is used on a textile product, it is desirable for the water repellency of the product to be maintained even after laundering. However, Patent Documents 1 to 3 make no mention of the water repellency after laundering.

PRIOR ART DOCUMENTS

Patent Documents

Patent Document 1: JP 3973184
Patent Document 2: JP 3496976
Patent Document 3: JP 4726647

SUMMARY OF INVENTION

Technical Problem

In light of the above problems with the prior art, one object of the present invention is to provide a water repellent composition which has an excellent water repellency-imparting effect and which moreover can impart a good softness to treated fibers. Another object of the invention is to provide a water repellent composition which is able to maintain a good water repellency even after laundering.

Solution to Problem

The inventor has conducted intensive investigations aimed at achieving these objects and has found as a result that a water repellent composition containing components (A) to (D) below is able to impart a high water repellency and a good softness to textile fibers. The inventor has also found that by treating textile fibers with the water repellent composition of the invention, it is possible to maintain a good water repellency even after laundering. These discoveries ultimately led to the present invention.

Accordingly, the present invention provides the following water repellent composition and textile treatment agent.

1. A water repellent composition containing:
   (A) 100 parts by weight of a trialkylsiloxy silicate of average composition formula (1) below

[Chem. 1]

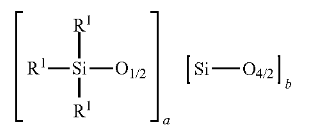

(1)

(wherein each $R^1$ is independently an unsubstituted monovalent hydrocarbon group of 1 to 20 carbon atoms, and a/b is from 0.5 to 1.5);
   (B) from 1 to 100 parts by weight of an organopolysiloxane of formula (2) below having at least two hydroxyl or alkoxy groups on the molecule

[Chem. 2]

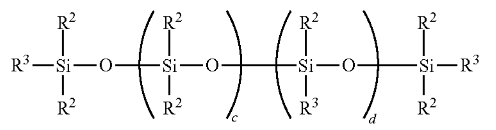

(2)

(wherein each $R^2$ is independently an unsubstituted monovalent hydrocarbon group of 1 to 20 carbon atoms, each $R^3$ is independently a group selected from a hydroxyl group and alkoxy groups of 1 to 4 carbon atoms, c is from 3 to 5,000, and d is from 0 to 50);
   (C) from 10 to 300 parts by weight of one or more compound selected from the group consisting of tetraalkoxytitaniums, tetraalkoxyzirconiums and hydrolyzates thereof represented by general formula (3) below

(3)

(wherein M is titanium or zirconium, and each X is independently an alkyl group of 1 to 8 carbon atoms); and
   (D) from 100 to 30,000 parts by weight of an organic solvent.

2. The water repellent composition of 1 above, further containing:
   (E) from 3 to 300 parts by weight of an organopolysiloxane of formula (4) below

[Chem. 3]

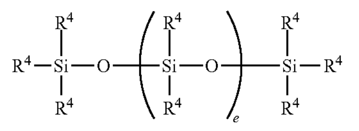

(4)

(wherein each $R^4$ is independently an unsubstituted monovalent hydrocarbon group of 1 to 20 carbon atoms, and e is from 10 to 3,000).

3. The water repellent composition of 1 or 2 above, wherein component (C) is one or more compound selected from the group consisting of tetrapropoxytitanium, tetrabutoxytitanium, tetrabutoxyzirconium, tetrapropoxyzirconium and hydrolyzates thereof.
4. The water repellent composition of any of 1 to 3 above which is free of fluorine compounds.
5. A textile treatment agent which includes the water repellent composition of any of 1 to 4 above.

Advantageous Effects of Invention

The water repellent composition of the invention is able to impart a high water repellency and good softness to textile fibers. In addition, by treating textile fibers with the water repellent composition of the invention, it is possible to maintain a good water repellency even after laundering.

DESCRIPTION OF EMBODIMENTS

The invention is described in detail below.

[Component (A)]

Component (A) of the invention is a trialkylsiloxy silicate of average composition formula (1) below

[Chem. 4]

(1)

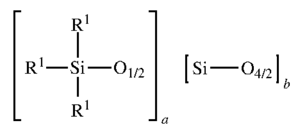

(wherein each $R^1$ is independently an unsubstituted monovalent hydrocarbon group of 1 to 20 carbon atoms, and a/b is from 0.5 to 1.5). One such compound may be used alone or two or more may be used in combination.

Each $R^1$ is independently an unsubstituted monovalent hydrocarbon group of 1 to 20 carbon atoms, examples of which include alkyl groups such as methyl, ethyl, propyl, isopropyl, butyl, t-butyl, hexyl, cyclohexyl, heptyl, octyl, nonyl, decyl, tetradecyl and octadecyl groups; alkenyl groups such as vinyl, allyl, 5-hexenyl and oleyl groups; and aryl groups such as phenyl, tolyl and naphthyl groups. Of these, methyl and phenyl groups are preferred. From the standpoint of the water repellency, a methyl group is more preferred.

The ratio a/b is from 0.5 to 1.5, and preferably from 0.6 to 1.4. When a/b is less than 0.5, the solubility in the organic solvent serving as component (D) is poor; when a/b is greater than 1.5, the water repellency decreases.

Component (A) can be obtained by a known method that involves hydrolyzing a triorganochlorosilane, a triorganohydroxysilane, a hexaorganodisiloxysilane, water glass, an alkyl polysilicate or the like. Some hydroxyl groups remain at $R^1$ in the product (A) following hydrolysis, but residual hydroxyl groups may be present at $R^1$ in this invention. The amount of residual hydroxyl groups in component (A) is preferably from 0.1 to 12 wt %, and more preferably from 0.2 to 10 wt %, of component (A). As for how to measure the amount of such residual hydroxyl groups, several techniques that use the chemical reactivity of hydroxyl groups are described in the literature. In this invention, the silanol group content is determined by dissolving the substrate (the substance whose silanol group content is to be measured) in anhydrous toluene, then reacting it with a Grignard reagent ($CH_3MgI$) and quantifying the amount of methane generated by the reaction below.

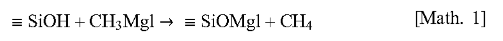

[Math. 1]

The weight-average molecular weight of component (A) is preferably from 500 to 10,000, and more preferably from 1,000 to 8,000. The weight-average molecular weight generally can be determined as the polystyrene-equivalent weight-average molecular weight obtained by gel permeation chromatographic (GPC) analysis using toluene, tetrahydrofuran (THF) or the like as the developing solvent. The GPC measurement conditions in this invention are as follows.

[GPC Measurement Conditions]

| | |
|---|---|
| Developing solvent: | toluene |
| Flow rate: | 0.3 mL/min |
| Detector: | differential refractometer |
| Columns: | TSK Guardcolumn SuperH-H<br>TSKgel SuperHM-N<br>(one 6.0 mm I.D. × 15 cm column)<br>TSKgel SuperH2500<br>(one 6.0 mm I.D. × 15 cm column)<br>(both from Tosoh Corporation) |
| Column temperature: | 40° C. |
| Sample injection amount: | 50 μL (toluene solution having a sample concentration of 0.2 wt %) |

[Component (B)]

Component (B) of the invention is an organopolysiloxane of formula (2) below having at least two hydroxyl or alkoxy groups on the molecule

[Chem. 5]

(2)

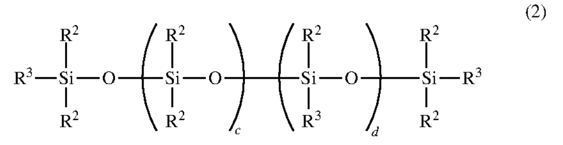

(wherein each $R^2$ is independently an unsubstituted monovalent hydrocarbon group of 1 to 20 carbon atoms, each $R^3$ is independently a group selected from a hydroxyl group and alkoxy groups of 1 to 4 carbon atoms, c is from 3 to 5,000, and d is from 0 to 50). One such compound may be used alone or two or more may be used in combination. The siloxane units in the formula may be arranged in any order.

Each $R^2$ is independently an unsubstituted monovalent hydrocarbon group of 1 to 20 carbon atoms, examples of which include alkyl groups such as methyl, ethyl, propyl, isopropyl, butyl, t-butyl, hexyl, cyclohexyl, heptyl, octyl, nonyl, decyl, tetradecyl and octadecyl groups; alkenyl groups such as vinyl, allyl, 5-hexenyl and oleyl groups; and aryl groups such as phenyl, tolyl and naphthyl groups. Of these, methyl and phenyl groups are preferred. From the standpoint of water repellency, a methyl group is especially preferred.

Each $R^3$ is independently a group selected from a hydroxyl group and alkoxy groups of 1 to 4 carbon atoms, preferably a hydroxyl group, methoxy group or ethoxy group, and more preferably a hydroxyl group.

The subscript ‘c’ is from 3 to 5,000, preferably from 3 to 4,500, and more preferably from 5 to 4,000. The subscript ‘d’ is from 0 to 50, preferably from 0 to 30, and more preferably from 0 to 15. In some cases, d may be 1 or more.

Component (B) is exemplified by compounds of the following formulas.

[Chem. 6]

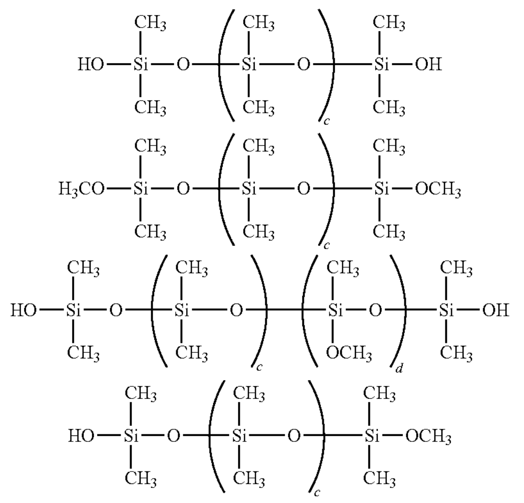

(wherein c and d are as defined above).

The content of component (B) per 100 parts by weight of component (A) is from 1 to 100 parts by weight, preferably from 2 to 80 parts by weight, and more preferably from 5 to 50 parts by weight.

[Component (C)]

Component (C) of the invention is one or more compound selected from the group consisting of tetraalkoxytitaniums, tetraalkoxyzirconiums and hydrolyzates thereof represented by the formula

(3)

(wherein M is titanium or zirconium, and each X is independently an alkyl group of 1 to 8 carbon atoms). One such compound may be used alone or two or more may be used in combination.

Examples of X include methyl, ethyl, propyl, butyl, pentyl, hexyl, heptyl and octyl groups. Of these, from the standpoint of stability, propyl and butyl groups are preferred.

Specific examples of component (C) include the following: tetrapropoxytitanium, tetrabutoxytitanium, tetraoctoxytitanium and hydrolyzates thereof; and tetrabutoxyzirconium, tetrapropoxyzirconium, tetraoctoxyzirconium and hydrolyzates thereof. Of these, in terms of catalytic activity and stability, tetrapropoxytitanium, tetrabutoxytitanium, tetrabutoxyzirconium, tetrapropoxyzirconium and hydrolyzates thereof are preferred.

The content of component (C) per 100 parts by weight of component (A) is from 10 to 300 parts by weight, and preferably from 20 to 200 parts by weight. At a component (C) content of less than 10 parts by weight, the crosslinking effects weaken and the water repellency decreases. At a component (C) content greater than 300 parts by weight, the shelf stability of the water repellent composition decreases.

[Component (D)]

Component (D) of the invention is an organic solvent which dissolves above components (A), (B) and (C), preferably one which dissolves them uniformly. Examples of component (D) include monovalent alcohols such as propanol and butanol; divalent alcohols such as propylene glycol; aromatic hydrocarbons such as toluene and xylene; aliphatic hydrocarbons such as n-hexane, n-heptane and isoparaffin; esters such as ethyl acetate; ketones such as acetone and methyl ethyl ketone; alicyclic hydrocarbons such as cyclohexane; and volatile organopolysiloxanes such as octamethylcyclotetrasiloxane, decamethylcyclopentasiloxane, hexamethyldisiloxane and octamethyltrisiloxane. These may be used singly or two or more may be used in combination. Of these, from the standpoints of workability and drying characteristics, isopropanol, n-hexane, n-heptane, toluene, xylene, and isoparaffin having a boiling point of 200° C. or less are preferred.

The component (D) content per 100 parts by weight of component (A) is from 100 to 30,000 parts by weight, and preferably from 150 to 10,000 parts by weight. At a component (D) content below 100 parts by weight, the storage stability of the water repellent composition decreases; at a content greater than 30,000 parts by weight, the water repellency of the object being treated decreases.

[Component (E)]

In addition to the above essential ingredients, to improve softness, it is preferable for the water repellent composition of the invention to include also component (E) below.

Component (E) of the invention is an organopolysiloxane of formula (4) below

[Chem. 7]

(4)

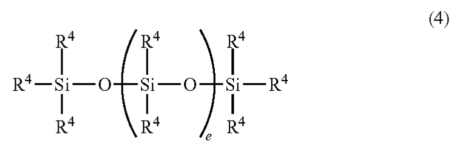

(wherein each $R^4$ is independently an unsubstituted monovalent hydrocarbon group of 1 to 20 carbon atoms, and e is from 10 to 3,000). Component (E) may be of one type used alone or two or more types may be used in combination.

Each $R^4$ is independently an unsubstituted monovalent hydrocarbon group of 1 to 20 carbon atoms. Examples include alkyl groups such as methyl, ethyl, propyl, isopropyl, butyl, t-butyl, hexyl, cyclohexyl, heptyl, octyl, nonyl, decyl, tetradecyl and octadecyl groups; alkenyl groups such as vinyl, allyl, 5-hexenyl and oleyl groups; and aryl groups such as phenyl, tolyl and naphthyl groups. Of these, methyl and phenyl groups are preferred. From the standpoint of the water repellency, a methyl group is more preferred. The subscript ‘e’ is from 10 to 3,000, preferably from 40 to 2,000, and more preferably from 50 to 1,000.

Component (E) is exemplified by compounds of the following formulas

[Chem. 8]

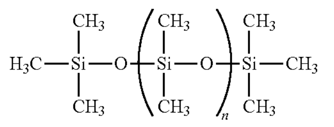

-continued

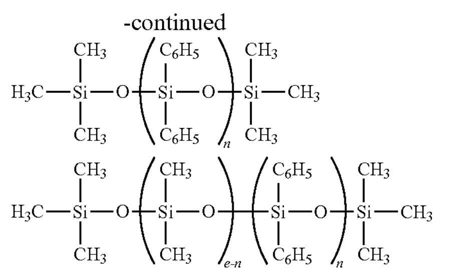

(wherein e is as defined above, and n is from 0 to 300).

When component (E) is included, the content thereof per 100 parts by weight of component (A) is from 3 to 300 parts by weight, preferably from 10 to 300 parts by weight, and more preferably from 30 to 250 parts by weight.

[Water Repellent Composition]

The water repellent composition of the invention may suitably include, within ranges that do not detract from the advantageous effects of the invention, various thickeners, pigments, dyes, penetrants, antistatic agents, antifoaming agents, flame retardants, antimicrobial agents, preservatives, crosslinking agents and adhesion promoters, and also other silicone oils, silicone resins, acrylic resins and urethane resins.

The method for preparing the water repellent composition of the invention is not particularly limited, so long as the above essential ingredients and optional ingredients are mixed together.

The water repellent composition of the invention may be used to treat various types of substrate surfaces, including textiles, paper, metal, wood, rubber, plastic and glass. Various known coating methods such as dipping, spraying, roll coating, bar coating and brushing may be used as the method of application onto substrates.

The coating weight of the composition is not particularly limited. In general, the coating weight in terms of the water repellent composition is preferably from 0.1 to 200 $g/m^2$, and more preferably from 1 to 100 $g/m^2$. After coating, a film can be obtained by drying alone. Such drying should be carried out under conditions that allow the organic solvent to evaporate. At room temperature, drying may be carried out for a period of from 1 hour to 348 hours; when heating is carried out at between 50° C. and 180° C., drying may be carried out for a period of from about 1 minute to about 30 minutes.

[Textile Treatment Agent]

Because the surfaces of textile fibers following treatment have an excellent water repellency, the water repellent composition of the invention is useful as an active ingredient for a textile treatment agent. The composition may be used directly as a textile treatment agent or may be suitably included in a textile treatment agent within a range of, for example, from 0.01 to 99 wt %. Here, other ingredients within the textile treatment agent include, for example, textile finishes such as anti-creasing agents, flame retardants, antistatic agents and heat stabilizers, and also antioxidants, ultraviolet absorbers, pigments, metal flake pigments, rheology control agents, curing accelerators, deodorants and antimicrobial agents.

In cases where textile fibers are to be treated, the textile treatment agent may be diluted and used. The content of the water repellent composition within the textile treatment agent dilution for treating textile fibers, expressed as the solids content, is preferably from 0.01 to 10 wt %, and more preferably from 0.1 to 5 wt %.

The textile treatment agent of the invention is effective on all of the following: natural fibers such as cotton, silk, linen, wool, angora and mohair; synthetic fibers such as polyester, nylon, acrylics, urethane and spandex; and also textile products in which these are used. Nor are there any limitations as to the form and shape of such textile fibers and products, the textile treatment agent of the invention being suitable for use in treating not only raw materials in the form of staple fiber, filament, tow, yarn and the like, but also various fabricated forms such as knit fabric, woven fabric, batting, nonwoven fabric, paper, sheet and film.

The water repellent composition of the invention may be employed also on substrates other than textiles. Substrates to which this water repellent composition may be applied include porous inorganic materials such as concrete, lightweight concrete, lightweight aerated concrete (ALC), mortar, various cement boards, gypsum boards, calcium silicate boards, brick, tile, and stone. In addition, they may also be used on walls composed primarily of diatomaceous earth, clay or plaster, and on porous organic materials such as paper, wood and leather.

EXAMPLES

The invention is described more fully below by way of Examples and Comparative Examples, although these Examples do not limit the invention. In the following Examples, unless noted otherwise, "%" stands for percent by weight.

Example 1

A water repellent composition was obtained by mixing together:

(A) 100 parts by weight of (A-1) the trimethyl silicate of formula (A-1) below (weight-average molecular weight, 3,500; a/b=0.75)

[Chem. 9]

(A-1)

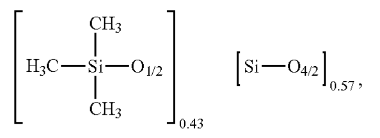

(B) 8.33 parts by weight of (B-1) the organopolysiloxane of formula (B-1) below

[Chem. 10]

(B-1)

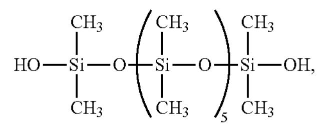

(C) 166.67 parts by weight of (C-1) B-4 (trade name) from Nippon Soda Co., Ltd. (a hydrolytic condensate of tetrabutoxytitanium), and (D) 225 parts by weight of isopropanol.

Example 2

A water repellent composition was obtained by mixing together:

(A) 100 parts by weight of (A-1) the trimethyl silicate of above formula (A-1), (B) 8.33 parts by weight of (B-1) the organopolysiloxane of above formula (B-1), (C) 200 parts by weight of (C-2) ZA-65 (trade name) from Matsumoto Fine Chemical Co., Ltd. (tetrabutoxyzirconium), and (D) 225 parts by weight of isopropanol.

Example 3

A water repellent composition was obtained by mixing together:

(A) 100 parts by weight of (A-1) the trimethyl silicate of above formula (A-1), (B) 10 parts by weight of (B-2) the organopolysiloxane of formula (B-2) below

[Chem. 11]

(B-2)

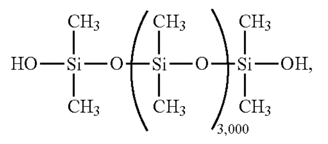

(C) 155 parts by weight of (C-1) B-4 (trade name) from Nippon Soda Co., Ltd. (a hydrolytic condensate of tetrabutoxytitanium), and (D) 166.67 parts by weight of toluene.

Example 4

A water repellent composition was obtained by mixing together:

(A) 100 parts by weight of (A-1) the trimethyl silicate of above formula (A-1), (B) 8.33 parts by weight of (B-1) the organopolysiloxane of above formula (B-1), (C) 166.67 parts by weight of (C-1) B-4 (trade name) from Nippon Soda Co., Ltd. (a hydrolytic condensate of tetrabutoxytitanium), (D) 225 parts by weight of isopropanol, and (E) 166.67 parts by weight of (E-1) the organopolysiloxane of formula (E-1) below

[Chem. 12]

(E-1)

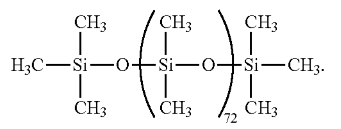

Example 5

A water repellent composition was obtained by mixing together:

(A) 100 parts by weight of (A-1) the trimethyl silicate of above formula (A-1), (B) 10 parts by weight of (B-2) the organopolysiloxane of above formula (B-2), (C) 153.69 parts by weight of (C-1) B-4 (trade name) from Nippon Soda Co., Ltd. (a hydrolytic condensate of tetrabutoxytitanium), (D) 166.67 parts by weight of toluene, and (E) 166.67 parts by weight of the organopolysiloxane of above formula (E-1).

Example 6

A water repellent composition was obtained by mixing together:

(A) 100 parts by weight of (A-2) the trimethyl silicate of formula (A-2) below (weight-average molecular weight, 4,000; a/b=1.2)

[Chem. 13]

(A-2)

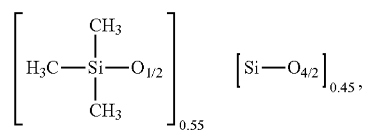

(B) 8.33 parts by weight of the organopolysiloxane of above formula (B-1), (C) 166.67 parts by weight of (C-1) B-4 (trade name) from Nippon Soda Co., Ltd. (a hydrolytic condensate of tetrabutoxytitanium), (D) 166.67 parts by weight of toluene, and (E) 166.67 parts by weight of the organopolysiloxane of above formula (E-1).

Example 7

A water repellent composition was obtained by mixing together:

(A) 100 parts by weight of the trimethyl silicate of above formula (A-1), (B) 20 parts by weight of the organopolysiloxane of formula (B-3) below

[Chem. 14]

(B-3)

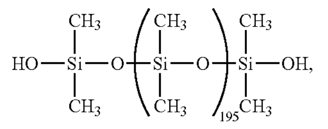

(C) 166.67 parts by weight of (C-1) B-4 (trade name) from Nippon Soda Co., Ltd. (a hydrolytic condensate of tetrabutoxytitanium), (D) 225 parts by weight of isopropanol, and (E) 166.67 parts by weight of the organopolysiloxane of above formula (E-1).

Example 8

A water repellent composition was obtained by mixing together:

(A) 100 parts by weight of (A-1) the trimethyl silicate of above formula (A-1), (B) 8.33 parts by weight of (B-4) the organopolysiloxane of formula (B-4) below

[Chem. 15]

(B-4)

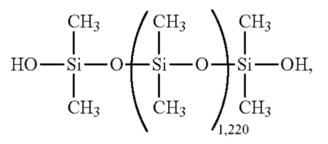

(C) 166.67 parts by weight of (C-1) B-4 (trade name) from Nippon Soda Co., Ltd. (a hydrolytic condensate of tetrabutoxytitanium), (D) 225 parts by weight of toluene, and (E) 166.67 parts by weight of the organopolysiloxane of above formula (E-1).

Example 9

A water repellent composition was obtained by mixing together:

(A) 100 parts by weight of the trimethyl silicate of above formula (A-1), (B) 8.33 parts by weight of the organopolysiloxane of above formula (B-1), (C) 166.67 parts by weight of (C-2) ZA-65 (trade name) from Matsumoto Fine Chemical Co., Ltd., (D) 225 parts by weight of isopropanol, and (E) 166.67 parts by weight of the organopolysiloxane of above formula (E-1).

Example 10

A water repellent composition was obtained by mixing together:

(A) 100 parts by weight of the trimethyl silicate of above formula (A-1), (B) 8.33 parts by weight of the organopolysiloxane of above formula (B-1), (C) 166.67 parts by weight of (C-1) B-4 (trade name) from Nippon Soda Co., Ltd. (a hydrolytic condensate of tetrabutoxytitanium), (D) 225 parts by weight of isopropanol, and (E) 170 parts by weight of (E-2) the organopolysiloxane of formula (E-2) below

[Chem. 16]

(E-2)

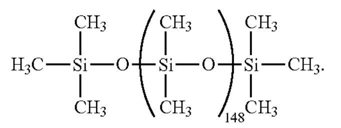

Example 11

A water repellent composition was obtained by mixing together:

(A) 100 parts by weight of the trimethyl silicate of above formula (A-1), (B) 8.33 parts by weight of the organopolysiloxane of above formula (B-1), (C) 166.67 parts by weight of (C-1) B-4 (trade name) from Nippon Soda Co., Ltd. (a hydrolytic condensate of tetrabutoxytitanium), (D) 225 parts by weight of toluene, and (E) 80 parts by weight of (E-3) the organopolysiloxane of formula (E-3) below

[Chem. 17]

(E-3)

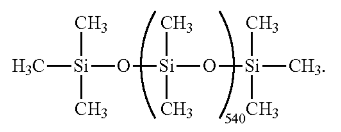

Comparative Example 1

A water repellent composition was obtained by mixing together:

(A) 100 parts by weight of the trimethyl silicate of above formula (A-1), (B) 8.33 parts by weight of the organopolysiloxane of above formula (B-1), and (D) 225 parts by weight of toluene.

Comparative Example 2

A water repellent composition was obtained by mixing together:

(A) 100 parts by weight of the trimethyl silicate of above formula (A-1), (C) 166.67 parts by weight of (C-1) B-4 (trade name) from Nippon Soda Co., Ltd., and (D) 225 parts by weight of toluene.

Comparative Example 3

A water repellent composition was obtained by mixing together:

(B) 100 parts by weight of the organopolysiloxane of above formula (B-1), (C) 166.67 parts by weight of (C-1) B-4 (trade name) from Nippon Soda Co., Ltd. (a hydrolytic condensate of tetrabutoxytitanium), and (D) 225 parts by weight of toluene.

Comparative Example 4

A water repellent composition was obtained by mixing together:

(A) 100 parts by weight of the trimethyl silicate of above formula (A-1), (B) 8.33 parts by weight of the organopolysiloxane of above formula (B-1), (D) 225 parts by weight of toluene, and (E) 166.67 parts by weight of the organopolysiloxane of above formula (E-1).

Comparative Example 5

A water repellent composition was obtained by mixing together:

(A) 100 parts by weight of the trimethyl silicate of above formula (A-1), (B) 10 parts by weight of the organopolysiloxane of above formula (B-1), (C) 1.00 part by weight of (C-1) B-4 (trade name) from Nippon Soda Co., Ltd. (a hydrolytic condensate of tetrabutoxytitanium), and (D) 225 parts by weight of toluene.

Comparative Example 6

A water repellent composition was obtained by mixing together:

(A) 100 parts by weight of the trimethyl silicate of above formula (A-1), (B) 0.05 part by weight of the organopolysiloxane of above formula (B-1), (C) 150 parts by weight of (C-1) B-4 (trade name) from Nippon Soda Co., Ltd. (a hydrolytic condensate of tetrabutoxytitanium), and (D) 225 parts by weight of toluene.

The evaluation tests shown below were performed on the water repellent compositions thus obtained. The results are shown in the tables.

[Evaluation Tests]

1. Softness

A test liquor was prepared by adding toluene to the water repellent composition and stirring, then diluting the composition to a combined concentration for components (A) and (B) of 1.5%. A polyester/cotton broadcloth (65%/35%) was dipped for 10 seconds in the test liquor, following which a roller was used to squeeze the cloth to a percent expression of 100% and the cloth was dried for 2 minutes at 150° C., thereby producing a treated cloth for softness evaluation. A panel of three judges touched the treated cloth with their hands and rated the softness compared with that of an untreated cloth on the following scale of 0 to 3. The results are indicated in terms of the evaluation criteria below which are based on the total score for the three panelists.

<Score>

3 points: Very good feel to the touch compared with untreated cloth.

2 points: Good feel to the touch compared with untreated cloth.

1 point: Feel to the touch is comparable to that of untreated cloth.

0 points: Feel to the touch is worse than that of untreated cloth.

<Evaluation Criteria>

◎: Total of 7 points or more

○: Total of 5 to 6 points

Δ: Total of 3 to 4 points x: Total of 2 points or less

2. Water Repellency

A test liquor was prepared by adding toluene to the water repellent composition and stirring, then diluting the composition to a combined concentration for components (A) and (B) of 1.5%. A polyester/cotton broadcloth (65%/35%) was dipped for 10 seconds in the test liquor, following which a roller was used to squeeze the cloth to a percent expression of 100% and the cloth was dried for 2 minutes at 150° C., thereby producing a treated cloth for evaluation. This treated cloth was tested in accordance with the spray method in JIS-L1092. The results were visually rated on the following scale.

Water Repellency: Condition

5: Cloth has no adhering moistness on surface

4: Cloth shows slight adhering moistness on surface

3: Cloth shows localized moistness on surface

2: Cloth shows moistness on surface

1: Cloth is moist over entire surface

0: Cloth is completely moist on both front and back sides

3. Water Repellency after Laundering

A test liquor was prepared by adding toluene to the water repellent composition and stirring, then diluting the composition such that the combined amount of components (A) and (B) becomes 1.5%. A polyester/cotton broadcloth (65%/35%) was dipped for 10 seconds in the test liquor, following which a roller was used to squeeze the cloth to a percent expression of 100% and the cloth was dried for 2 minutes at 150° C., thereby producing a treated cloth for evaluation. The treated cloth was then laundered once with a washing machine by the method in JIS L0217 103. After laundering, the treated cloth was tested in accordance with the spray method in JIS-L1092. The results were visually examined and rated on the following scale.

Water Repellency: Condition

5: Cloth has no adhering moistness on surface

4: Cloth shows slight adhering moistness on surface

3: Cloth shows localized moistness on surface

2: Cloth shows moistness on surface

1: Cloth is moist over entire surface

0: Cloth is completely moist on both front and back sides

TABLE 1

| Formulation (pbw) | | Example 1 | Example 2 | Example 3 | Example 4 | Example 5 |
|---|---|---|---|---|---|---|
| (A) | (A-1) | 100 | 100 | 100 | 100 | 100 |
| | (A-2) | | | | | |
| (B) | (B-1) | 8.83 | 8.33 | | 8.33 | |
| | (B-2) | | | 10.00 | | 10.00 |
| | (B-3) | | | | | |
| | (B-4) | | | | | |
| (C) | (C-1) | 166.67 | | 155 | 166.67 | 153.69 |
| | (C-2) | | 200 | | | |
| (D) | Isopropanol | 225 | 225 | | 225 | |
| | Toluene | | | 166.67 | | 166.67 |
| (E) | (E-1) | | | | 166.67 | 166.67 |
| | (E-2) | | | | | |
| | (E-3) | | | | | |
| Softness | | ○ | ○ | ○ | ◎ | ◎ |
| Water repellency | | 5 | 5 | 5 | 5 | 5 |
| Water repellency after laundering | | 4 | 4 | 4 | 4 | 4 |

TABLE 2

| Formulation (pbw) | | Example 6 | Example 7 | Example 8 | Example 9 | Example 10 |
|---|---|---|---|---|---|---|
| (A) | (A-1) | | 100 | 100 | 100 | 100 |
| | (A-2) | 100 | | | | |
| (B) | (B-1) | 8.33 | | | 8.33 | 8.33 |
| | (B-2) | | | | | |
| | (B-3) | | 20 | | | |
| | (B-4) | | | 8.33 | | |
| (C) | (C-1) | 166.67 | 166.67 | 166.67 | | 166.67 |
| | (C-2) | | | | 166.67 | |
| (D) | Isopropanol | | 225 | | 225 | 225 |
| | Toluene | 166.67 | | 225 | | |
| (E) | (E-1) | 166.67 | 166.67 | 166.67 | 166.67 | |
| | (E-2) | | | | | 170 |
| | (E-3) | | | | | |
| Softness | | ◎ | ◎ | ◎ | ◎ | ◎ |
| Water repellency | | 5 | 5 | 5 | 5 | 5 |
| Water repellency after laundering | | 4 | 4 | 4 | 4 | 4 |

TABLE 3

| Formulation (pbw) | | Example 11 | Comparative Example 1 | Comparative Example 2 | Comparative Example 3 | Comparative Example 4 |
|---|---|---|---|---|---|---|
| (A) | (A-1) | 100 | 100 | 100 | | 100 |
| | (A-2) | | | | | |
| (B) | (B-1) | 8.33 | 8.33 | | 100 | 8.33 |
| | (B-2) | | | | | |
| | (B-3) | | | | | |
| | (B-4) | | | | | |
| (C) | (C-1) | 166.67 | | 166.67 | 166.67 | |
| | (C-2) | | | | | |
| (D) | Isopropanol | | | | | |
| | Toluene | 225 | 225 | 225 | 225 | 225 |
| (E) | (E-1) | | | | | 166.67 |
| | (E-2) | | | | | |
| | (E-3) | 80 | | | | |
| Softness | | ◎ | ○ | Δ | ○ | ○ |
| Water repellency | | 5 | 1 | 4 | 3 | 2 |
| Water repellency after laundering | | 4 | 0 | 2 | 2 | 1 |

TABLE 4

| Formulation (pbw) | | Comparative Example 5 | Comparative Example 6 |
|---|---|---|---|
| (A) | (A-1) | 100 | 100 |
| | (A-2) | | |
| (B) | (B-1) | 10 | 0.05 |
| | (B-2) | | |
| | (B-3) | | |
| | (B-4) | | |
| (C) | (C-1) | 1 | 150 |
| | (C-2) | | |
| (D) | Isopropanol | | |
| | Toluene | 225 | 225 |
| (E) | (E-1) | | |
| | (E-2) | | |
| | (E-3) | | |
| Softness | | Δ | X |
| Water repellency | | 3 | 4 |
| Water repellency after laundering | | 1 | 2 |

As shown in the above tables, the water repellent compositions of the invention have an excellent water repellency-imparting effect and cloth treated therewith has a good softness. In addition, it is possible to maintain a good water repellency even after laundering.

INDUSTRIAL APPLICABILITY

The water repellent composition of the invention has an excellent water repellency-imparting effect. When used as a textile treatment agent, cloth treated therewith has a good softness. In addition, the treated cloth is able to maintain a good water repellency even after laundering.

The invention claimed is:

1. A water repellent composition comprising:

(A) 100 parts by weight of a trialkylsiloxy silicate of average composition formula (1) below

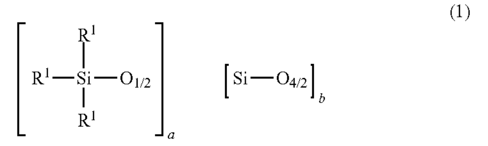

(1)

wherein each $R^1$ is independently an alkyl group of 1 to 20 carbon atoms, and a/b is from 0.5 to 1.5;

(B) from 1 to 100 parts by weight of an organopolysiloxane of formula (2) below having at least two hydroxyl or alkoxy groups on the molecule (2)

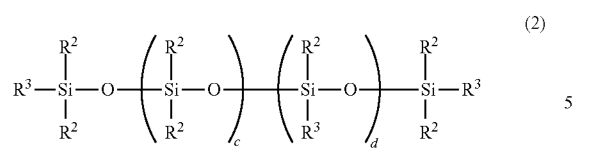

wherein each $R^2$ is independently an unsubstituted monovalent hydrocarbon group of 1 to 20 carbon atoms, each $R^3$ is independently a group selected from a hydroxyl group and alkoxy groups of 1 to 4 carbon atoms, c is from 3 to 5,000, and d is from 0 to 50;

(C) from 10 to 300 parts by weight of one or more compound selected from the group consisting of tetraalkoxytitaniums, tetraalkoxyzirconiums and hydrolyzates thereof represented by general formula (3) below (3)

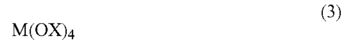

wherein M is titanium or zirconium, and each X is independently an alkyl group of 1 to 8 carbon atoms;

(D) from 100 to 30,000 parts by weight of an organic solvent; and (E) from 3 to 300 parts by weight of an organopolysiloxane of formula (4) below (4)

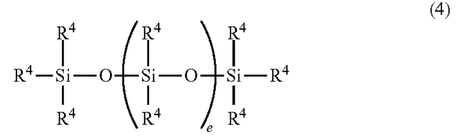

wherein each $R^4$ is independently an unsubstituted monovalent hydrocarbon group of 1 to 20 carbon atoms, and e is from 10 to 3,000.

2. The water repellent composition of claim 1, wherein component (C) is one or more compound selected from the group consisting of tetrapropoxytitanium, tetrabutoxytitanium, tetrabutoxyzirconium, tetrapropoxyzirconium and hydrolyzates thereof.

3. The water repellent composition of claim 1 which is free of fluorine compounds.

4. A textile treatment agent comprising the water repellent composition of claim 1.

* * * * *